(12) United States Patent
Heering

(10) Patent No.: US 12,545,782 B2
(45) Date of Patent: Feb. 10, 2026

(54) THERMALLY CURABLE COMPOSITIONS, THERMALLY CURED COMPOSITIONS, AND ARTICLES PREPARED THEREFROM

(71) Applicant: 3M INNOVATIVE PROPERTIES COMPANY, St. Paul, MN (US)

(72) Inventor: Christian Heering, Düsseldorf (DE)

(73) Assignee: 3M Innovative Properties Company, St. Paul, MN (US)

( * ) Notice: Subject to any disclaimer, the term of this patent is extended or adjusted under 35 U.S.C. 154(b) by 463 days.

(21) Appl. No.: 18/007,291

(22) PCT Filed: Aug. 20, 2021

(86) PCT No.: PCT/IB2021/057677
§ 371 (c)(1),
(2) Date: Jan. 27, 2023

(87) PCT Pub. No.: WO2022/043844
PCT Pub. Date: Mar. 3, 2022

(65) Prior Publication Data
US 2023/0279216 A1  Sep. 7, 2023

(30) Foreign Application Priority Data
Aug. 31, 2020  (EP) ..................................... 20193551

(51) Int. Cl.
*C08L 63/00* (2006.01)
*C08G 59/50* (2006.01)
*C08G 59/68* (2006.01)
*C08K 5/17* (2006.01)
*C09J 163/00* (2006.01)

(52) U.S. Cl.
CPC .......... *C08L 63/00* (2013.01); *C08G 59/5033* (2013.01); *C08G 59/686* (2013.01); *C08K 5/17* (2013.01); *C09J 163/00* (2013.01)

(58) Field of Classification Search
None
See application file for complete search history.

(56) References Cited

U.S. PATENT DOCUMENTS

| | | | | |
|---|---|---|---|---|
| 3,555,116 A * | 1/1971 | Edwin | .................. | C08K 5/3465 525/26 |
| 4,857,571 A | 8/1989 | Reiter et al. | | |
| 5,470,896 A | 11/1995 | Wegmann et al. | | |
| 9,023,956 B2 | 5/2015 | Kaneko et al. | | |
| 11,279,796 B2 | 3/2022 | Voci et al. | | |
| 2012/0004377 A1 | 1/2012 | Kaneko et al. | | |
| 2012/0283397 A1 * | 11/2012 | Takahashi | .................. | C08F 8/12 526/346 |
| 2014/0005344 A1 | 1/2014 | Rinker et al. | | |

(Continued)

FOREIGN PATENT DOCUMENTS

| | | |
|---|---|---|
| CN | 105694796 B | 10/2018 |
| CN | 110258132 A | 9/2019 |

(Continued)

OTHER PUBLICATIONS

Barrau, "The Stable Divalent Homoleptic Species (ArO)2M (Ar= 2,4,6-Tris((dimethylamino)methyl)phenyl; M=Ge, Sn, Pb)", 1998, Organometallics, vol. 17, No. 4, pp. 607-614.
Burton, "Acceleration of Amine-Cured Epoxy Resin Systems", Aug. 2013, Huntsman Corporation, 24 pages.
Extended European Search Report received for EP Application No. 20193551.7, mailed on Jan. 27, 2021, 2 pages.
International Search Report received for PCT International Application No. PCT/IB2021/057677, mailed on Oct. 25, 2021, 4 pages.
Kunert, "Structure and Reactivity of Sodium Phenoxide—Following the Course of the Kolbe-Schmitt Reaction", 1997, Chemische Berichte, vol. 130, No. 10, pp. 1461-1465.

(Continued)

*Primary Examiner* — Randy P Gulakowski
*Assistant Examiner* — Holley Grace Hester
(74) *Attorney, Agent, or Firm* — Jean A. Lown; Adrian L. Pishko

(57) ABSTRACT

Thermally curable compositions with excellent storage stability are provided that curing system comprising a compound of Formula (I). In Formula (I), $L^{+n}$ is a ulmetal or alkaline earth metal and n is equal to 1 or 2. Groups A and B are each independently an alkyl having 1 to 12 carbon atoms, a cycloalkyl having 3 to 12 carbon atoms, an aryl having 6 to 12 carbon atoms, an aralkyl or alkaryl group having from 7 to 12 carbon atoms, or a group of formula —$[(Z)$—$N(R^1)(R^2)]$ where Z is an alkylene having from 1 to 12 carbon atoms and $R^1$ and $R^2$ are each independently an alkyl groups having from 1 to 6 carbon atoms. Cured compositions formed from the thermally curable compositions, articles containing the thermally curable composition, articles containing the cured composition, and methods of bonding with the thermally curable compositions are provided. The thermally curable compositions can be used, for example, in various construction and transportation applications.

Formula (I).

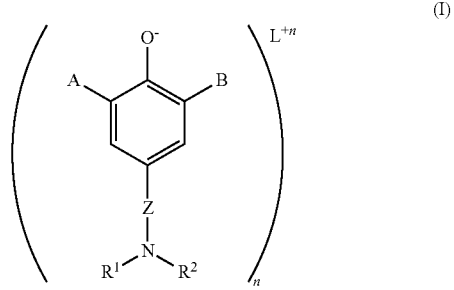

12 Claims, No Drawings

(56) References Cited

U.S. PATENT DOCUMENTS

| | | |
|---|---|---|
| 2015/0252146 A1 | 9/2015 | Gaefke et al. |
| 2018/0079710 A1 | 3/2018 | Kasemi et al. |
| 2020/0190252 A1 | 6/2020 | Voci et al. |

FOREIGN PATENT DOCUMENTS

| | | |
|---|---|---|
| EP | 2700683 A1 | 2/2014 |
| EP | 2679623 B1 | 1/2017 |
| EP | 2922889 B1 | 5/2017 |
| EP | 2954024 B1 | 5/2019 |
| WO | 2010106780 A1 | 9/2010 |
| WO | 2017197087 A1 | 11/2017 |
| WO | 2018212766 A1 | 11/2018 |
| WO | 2018219961 A1 | 12/2018 |

OTHER PUBLICATIONS

Schlosberg, Organic Chemistry of Calcium. Formation and Pyrolysis of Hydroxycalcium Phenoxides, 1988, Energy & Fuels, No. 2, pp. 582-585.

Singh, "Phosphazene-based Novel Organo-Inorganic Hybrid Salt: Synthesis, Characterization and Performance Evaluation as Multifunctional Additive in Polyol", 2017, RSC Advances, vol. 7, No. 22, pp. 13390-13397.

Three Bond Technical News, "Curing Agents for Epoxy Resin", Dec. 1990, pp. 1-10.

* cited by examiner

THERMALLY CURABLE COMPOSITIONS, THERMALLY CURED COMPOSITIONS, AND ARTICLES PREPARED THEREFROM

CROSS REFERENCE TO RELATED APPLICATIONS

This application is a national stage filing under 35 U.S.C. 371 of PCT/IB2021/057677, filed Aug. 20, 2021, which claims the benefit of EP Patent Application No. 20193551.7, filed Aug. 31, 2020, the disclosure of which is incorporated by reference in its/their entirety herein.

TECHNICAL FIELD

The present disclosure relates generally to the field of thermally curable compositions that include a latent thermal curing system. The thermally curable compositions are precursors of adhesive compositions such as structural adhesive compositions that are well suited for various construction and transportation applications.

BACKGROUND

Adhesives have been used for a variety of holding, sealing, protecting, marking, and masking purposes. One type of adhesive that is particularly preferred for many applications is represented by structural adhesives. Structural adhesives are typically thermosetting resin compositions that may be used to replace or augment conventional joining techniques such as screws, bolts, nails, staples, rivets, and metal fusion processes (e.g., welding, brazing, and soldering). Structural adhesives are used in a variety of applications that include general-use industrial applications as well as high-performance applications in the automotive and aerospace industries. To be suitable as structural adhesives, the adhesives typically exhibit high and durable mechanical strength as well as high impact resistance. Structural adhesives may, for example, be used for metal joints in vehicles. More particularly, structural adhesives may be used to bond a metal panel such as a roof panel to the support structure or chassis of the vehicle. Further, a structural adhesive may be used in joining two metal panels of a vehicle closure panel.

In some applications where a long pot life (or storage stability) is required for a curable composition, in particular a precursor of a structural adhesive composition, it is appropriate to use a so-called latent curing agent. This type of curable composition is often referred to as a "one-part curable composition" or as a "thermally curable composition". One-part epoxy resin containing curable compositions are typical examples of these compositions. Commonly known latent curing systems for use in one-part epoxy resin containing curable compositions include dicyandiamide (DICY), imidazoles, Lewis acid amine adducts, and organic acid hydrazides. Most of these latent curing systems are known to be toxic or mutagens, however, which makes them unsuitable for usage in many adhesive formulations.

A partial solution has been described, for example, in US-A1-2012/0004377 (Kaneko et al.), which discloses a clathrate that suppresses a curing reaction at low temperature, and which can cure an epoxy resin composition at a temperature exceeding 160° C.

Without contesting the technical advantages associated with the solutions known in the art, there is still a need for a thermal curing system which would overcome the above-mentioned deficiencies.

SUMMARY

Thermally curable compositions are provided that have a long pot life (e.g., a storage stability equal to at least one month when stored at temperatures no greater than 25 degrees Celsius and at a relative humidity of 50 percent), cured compositions formed therefrom, articles containing the thermally curable composition, articles containing the cured composition, and methods of bonding with the thermally curable compositions are provided. The thermally curable compositions can be used, for example, in various construction and transportation applications.

In a first aspect, a thermally curable composition is provided that contains (a) a thermally curable resin and (b) a thermal curing system comprising a compound of Formula (I).

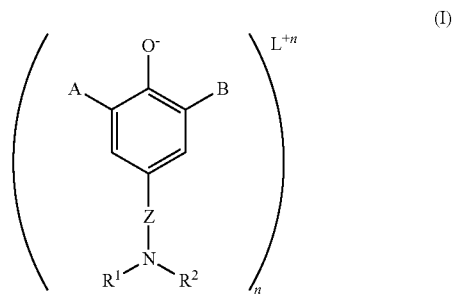

In Formula (I), is a cation of an alkali metal or alkaline earth metal where n is equal to 1 or 2. Groups A and B are each independently an alkyl having 1 to 12 carbon atoms, a cycloalkyl having 3 to 12 carbon atoms, an aryl having 6 to 12 carbon atoms, an aralkyl or alkaryl group having from 7 to 12 carbon atoms, or a group of formula $-[(Z)-N(R^1)(R^2)]$ where Z is an alkylene having from 1 to 12 carbon atoms and where $R^1$ and $R^2$ are each independently an alkyl groups having from 1 to 6 carbon atoms. The thermally curable composition has a pot life (i.e., storage stability) of at least 30 days when stored at room temperature and at 50 percent relative humidity.

In a second aspect, a cured composition is provided that is a reaction product of the thermally curable composition described above in the first aspect. The cured composition is typically an adhesive composition such as a structural adhesive composition.

In a third aspect, a first article is provided that includes a first substrate and a first surface of a thermally curable composition positioned adjacent to the first substrate. In some embodiments, the article further includes a second substrate positioned adjacent to a second surface of the thermally curable composition opposite the first surface of the thermally curable composition.

In a fourth aspect, a second article is provided that includes a first substrate, a second substrate, and a cured composition. A first surface of the cured composition is positioned adjacent to the first substrate and a second surface of the cured composition opposite the first surface is positioned adjacent to the second substrate. The first substrate is bonded to the second substrate through the cured composition. In some embodiments, the first substrate and the second substrates are each selected to be useful for construction or transportation applications.

In a fifth aspect, a method of bonding two substrates together is provided. The method includes providing a first substrate, a second substrate, and a thermally curable composition. The thermally curable composition is the same as described above in the first aspect. The method further includes positioning a first surface of the thermally curable composition adjacent to the first substrate. The method still further includes positioning the second substrate adjacent to a second surface of the thermally curable composition opposite the first surface of the thermally curable composition. The method yet further includes heating the thermally curable composition to form a cured composition that adheres to both the first substrate and the second substrate. The first substrate is bonded to the second substrate through the cured composition.

DETAILED DESCRIPTION

Thermally curable compositions are provided that have a pot life (e.g., a storage stability) equal to at least one month when stored at room temperature and 50 percent relative humidity.

These thermally curable compositions can be used to bond together two substrates such as those of interest to the construction and transportation industries.

As used herein, the terms "pot life" or "storage stability" refers to a length of time that the thermally curable compositions can be stored at room temperature (e.g., 20 to 25 degrees Celsius such as 23 degrees Celsius) and 50 percent relative humidity without becoming a solid composition. That is, the thermally curable composition has a viscosity suitable for applying as a fluid composition to a substrate. The pot life is typically at least 30 days for the thermally curable compositions described herein.

The thermally curable composition contains (a) a thermally curable resin and (b) a thermal curing system comprising a compound of Formula (I).

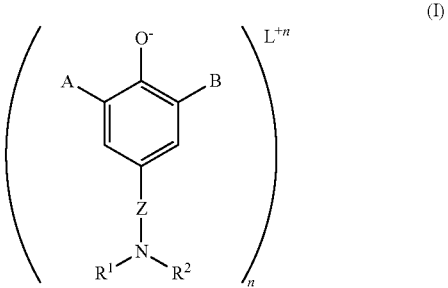

In Formula (I), $L^{+n}$ is a cation of an alkali metal or alkaline earth metal where n is equal to 1 or 2. Groups A and B are each independently an alkyl having 1 to 12 carbon atoms, a cycloalkyl having 3 to 12 carbon atoms, an aryl having 6 to 12 carbon atoms, an aralkyl or alkaryl group having from 7 to 12 carbon atoms, or a group of formula —[(Z)—N($R^1$)($R^2$)] where Z is an alkylene having from 1 to 12 carbon atoms and where $R^1$ and $R^2$ are each independently an alkyl groups having from 1 to 6 carbon atoms.

Thermal curing systems that contain the compound of Formula (I) can function as a latent curing system for thermally curable compositions such as those that are precursors of adhesive compositions. In particular, the thermal curing systems can function as a latent curing system for various thermally curable compositions that contain an epoxy resin and that can be cured to form a structural adhesive composition.

As such, the thermally curable compositions can be a one-pot composition due to their chemical and storage stability (pot life) that is typically at least one month when stored at room temperature (20 to 25 degrees Celsius) such as at 23 degrees Celsius and at 50 percent relative humidity. One-part thermally curable compositions can be advantageous over two-part curable compositions because they provide greater processing flexibility. That is, no mixing step and the associated equipment is required immediately before use.

The thermal curing system of the present disclosure can be used in thermally curable compositions, in particular one-part thermally curable precursors of adhesive compositions. In many embodiments, the thermally curable compositions contain an epoxy resin and is a precursor of a structural adhesive composition. These thermally curable compositions can have excellent characteristics and performance as to curing efficiency, curing speed and kinetics, curing profile reproducibility, curing profile predictability, and curing profile adjustability.

The thermally curable compositions are suitable for so-called snap or flash curing, which refers to a very fast curing action once properly initiated, which in turn may be performed via induction curing. This type of flash curing is particularly beneficial as it is compatible with automated handling and application, such as with fast robotic equipment that is typically used in the automotive manufacturing industry. The above-mentioned beneficial curing characteristics are further surprising and counterintuitive, as in many executions, the thermal curing system contains the compound of Formula (I), which is a sterically hindered phenolate-based compound, as the active curing agent.

The compounds of Formula (I) can function as thermolabile curing agents. These compounds have a sterically hindered phenolate group that acts as a ligand for the metal ion. The compounds can release the active curing agent upon thermal triggering via a dissociation mechanism of the phenolate based ligands. Advantageously, the thermal curing system that contains the compound of Formula (I) typically remains substantially inactive (from a curing action perspective) in a thermally curable composition upon storage for at least one month at room temperature (e.g., 23° C.) at 50 percent relative humidity.

It has further surprisingly been discovered that the thermal curing system containing the compound of Formula (I) can be used alone or in combination with another curing agent (i.e., co-curing agent). That is, the thermal curing system can include both the compound of Formula (I) and another curing agent. If used in combination with dicyandiamide (DICY), the compound of Formula (I) can function as a curing accelerator.

Advantageously still, the thermal curing system as described herein is activated at a temperature that is relatively low when compared to the latent thermal curing agents known in the art. For example, the thermal curing system as described above may be thermally triggered at a temperature as low as about 60° C. If the compound of Formula (I) is used in combination with another curing agent, this compound can shift the onset temperature for curing of the co-curing agent to a much lower temperature. For example, when dicyandiamide (DICY) is used as a co-curing agent, the compound of Formula (I) can shift the onset temperature for curing of DICY from about 180° C. down to about 100° C. or even lower.

In another beneficial aspect, the thermal curing system as described herein is non-toxic or at least substantially less toxic than many equivalent latent thermal curing agents known in the art, such as, for example, a phenyl ureas, imidazoles, Lewis acid amine adducts, and organic acid hydrazides, which are all known to be toxic or mutagens.

In another advantageous execution, the thermal curing system for use herein undergoes a striking colour change during the associated curing reaction, which allows monitoring or even quantifying the curing reaction and its progression until completion by simply monitoring the colour change and assessing the colour intensity variations. Incidentally, this visual indication benefit further allows detecting premature or unwanted curing reaction of the curing system.

In still another beneficial aspect, the thermal curing systems as described herein may be obtained according to relatively simple manufacturing processes using readily available starting materials.

The above-detailed set of advantageous properties provided by the thermal curing system described herein is even more surprising considering that, in one advantageous aspect, the compound of Formula (I) is in the form of a metal salt, which would have been expected to not only detrimentally affect the curing characteristics and performance of the thermal curing system in the associated thermally curable compositions, but would also have been expected to lead to unwanted solubility problems and stability issues, in particular undesired viscosity variations of the overall thermally curable composition.

In the context of the present disclosure, the Applicant was faced with the technical challenge of designing a latent thermal curing system able to provide a delicate balance of latent curing characteristics at relatively low temperature, acceptable toxicity characteristics, and excellent stability of the associated curable composition. Without wishing to be bound by theory, it is believed that these excellent characteristics and performance attributes are due to the presence of the compound of Formula (I) in the thermal curing system.

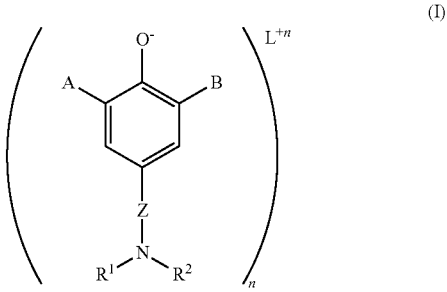

(I)

Group L in Formula (I) is an ionic group (cation) of an alkali metal or an alkaline earth metal. That is, the compound of Formula (I) is a salt. In some compounds of Formula (I), L is a sodium, potassium, calcium, or magnesium cation.

Groups A and B are each independently an alkyl having 1 to 12 carbon atoms, a cycloalkyl having 3 to 12 carbon atoms, an aryl having 6 to 12 carbon atoms, an aralkyl or alkaryl group having from 7 to 12 carbon atoms, or a group of formula —[(Z)—N($R^1$)($R^2$)] where Z is an alkylene having from 1 to 12 carbon atoms and $R^1$ and $R^2$ are each independently an alkyl groups having from 1 to 6 carbon atoms.

Suitable alkyl groups for A and B often have at least 1, at least 2, at least 3, or at least 4 carbon atoms and up to 12, up to 10, up to 8, up to 6, or up to 4 carbon atoms. These alkyl groups can be linear or branched. Examples of alkyl groups include, but are not limited to, methyl, ethyl, propyl, butyl, isobutyl, tert-butyl, pentyl, isopentyl, neopentyl, tert-pentyl, hexyl, neo-hexyl, tert- hexyl, cyclohexyl, octyl, nonyl, and decyl. In some examples, the alkyl group has a tertiary carbon such as in tert-butyl, neopentyl, tert-pentyl, neo-hexyl and tert-hexyl. In some even more specific examples, the alkyl is tert-butyl. Suitable cycloalkyl groups for A and B often have at least 3, at least 4, at least 5, or at least 6 carbon atoms and up to 12, up to 10, or up to 8 carbon atoms. All the carbon atoms can be members of the ring or some of the carbon atoms can be members of the ring with the remaining carbon atoms being alkyl groups attached to the ring members. Suitable aryl groups can have at least 6 carbon atoms and up to 12, up to 10, or up to 8 carbon members. The aryl can include a single ring or two rings that are bonded or fused together. Suitable aralkyl and alkaryl groups typically have a six membered aromatic ring bonded to an alkyl or alkylene group having 1 to 6 carbon atoms, 1 to 4 carbon atoms, or 1 to 2 carbon atoms.

In some embodiments, each A and B is a group of formula —[(Z)—N($R^1$)($R^2$)]. Group Z is an alkylene having from 1 to 12 carbon atoms. The number of carbon atoms in Z can be at least 1, at least 2, at least 3, or at least 4 and up to 12, up to 10, up to 6, up to 6, up to 4. In some examples, Z has 1 or 2 carbon atoms. In many examples, Z is methylene, ethylene, or propylene.

In some examples, Z is methylene. Groups IV and $R^2$ are each independently an alkyl groups having from 1 to 6 carbon atoms. The number of carbon atoms in $R^1$ and $R^2$ can be at least 1, at least 2, at least 3, at least 4 and up to 6, up to 4, up to 3, or up to 2. In many examples, $R^1$ and $R^2$ are each independently methyl, ethyl, or propyl. In some examples, $R^1$ and $R^2$ are both methyl.

The variable n is equal to 1 or 2 depending on the species L. If L is a cation of an alkali metal, n is equal to 1. If L is a cation of an alkaline earth metal, n is equal to 2.

Example compounds of Formula (I) include, but are not limited to, [2,6-di-tert-butyl-4-(dimethylaminomethyl) phenoxy]-lithium, [2,6-di-tert-butyl-4-(dimethylaminomethyl) phenoxy]-sodium, [2,6-di-tert-butyl-4-(dimethylaminomethyl)phenoxy]-potassium, bis[2,6-di-tert-butyl-4-(dimethylaminomethyl) phenoxy]-calcium, bis[2,6-di-tert-butyl-4-(dimethylaminomethyl) phenoxy]-magnesium, [2,4,6-tris((dimethylamino)methyl)phenoxy]-lithium, [2,4,6-tris ((dimethylamino)methyl) phenoxy]-sodium, [2,4,6-tris ((dimethylamino)methyl)phenoxy]-potassium, bis[2,4,6-tris ((dimethylamino)methyl)phenoxy]-calcium, bis[2,4,6-tris ((dimethylamino)methyl) phenoxy]-magnesium, or a mixture of any two or more.

According to an even more advantageous aspect, the compound of Formula (I) is [2,6-di-tert-butyl-4-(dimethylaminomethyl)phenoxy]-lithium, [2,6-di-tert-butyl-4-(dimethylaminomethyl) phenoxy]-sodium, [2,4,6-Tris((dimethylamino)methyl)phenoxy]-lithium, [2,4,6-Tris ((dimethylamino)methyl) phenoxy]-sodium, bis[2,4,6-Tris ((dimethylamino)methyl)phenoxy]-calcium, or a mixture of any two or more.

The compound of Formula (I) is a thermo-labile compound that is a salt. As used herein, the expression "thermo-labile compound" is meant to refer to the ability of the compound of Formula (I) to dissociate and release the ligands or melt once the triggering temperature has been exceeded. The compound of Formula (I) is typically capable of dissociating at a temperature greater than 50° C., greater than 60° C., greater than 70° C., greater than 80° C., or even greater than 90° C. and no greater than 180° C., no greater than 160° C., no greater than 150° C., no greater than 140° C., no greater than 120° C., no greater than 100° C., no greater than 90° C., no greater than 80° C., or even no greater than 70° C. For example, the compound of Formula (I) is usually capable of dissociating at a temperature in a range from 60° C. to 180° C., from 60° C. to 160° C., from 60° C. to 140° C., from 60° C. to 120° C., from 60° C. to 100° C., or from 70° C. to 100° C.

In addition to the compound of Formula (I), the thermal curing system can optionally further include a second (latent) thermal curing agent. Additional (latent) thermal curing agents for use in the thermal curing system are not particularly limited. Any second (latent) thermal curing agents commonly known in the art of thermally curable compositions, such as those that can be used with curable precursors of structural adhesives, may be present. Suitable second thermal curing agents include, for example, nitrile-based thermal curing agents, imidazole-based thermal curing agents, hydrazide-based thermal curing agents, and any combinations or mixtures thereof. In some examples, the optional second thermal curing agent for use herein is selected to be dicyandiamide.

The thermal curing system, which includes the compound of Formula (I), is combined with a thermally curable resin to form a thermally curable composition. The thermally curable composition is typically a one-part composition. That is, all the components of the thermally curable composition are present in a single part. The curable composition is not cured, however, until exposed to sufficient heat to dissociate the compound of Formula (I).

Thermally curable resins for use in the thermally curable compositions are not particularly limited. Any thermally curable resins commonly known in the art of thermally curable compositions such as, for example, thermally curable precursors of structural adhesives may be used. The thermally curable resin typically comprises a plurality of functional groups such as epoxy groups, isocyanate groups, urethane groups, or any combinations thereof. In many embodiments, the functional groups are epoxy groups In many embodiments, the thermally curable resin comprises at least two epoxy groups, which are usually glycidyl groups. That is, the thermally curable resin includes an epoxy resin such as, for example, a phenolic epoxy resin, bisphenol epoxy resin, hydrogenated epoxy resin, aliphatic epoxy resin, halogenated bisphenol epoxy resin, novolac epoxy resin, or any mixtures thereof. In some embodiments, the thermally curable resin is a novolac epoxy resin, a bisphenol epoxy resin (e.g., those derived from the reaction of bisphenol-A with epichlorohydrin (diglycidyl ether bisphenol-A (DGEBA) resins)), and any mixtures thereof. Epoxy resins are well known to those skilled in the art of structural adhesive compositions. Suitable epoxy resins for use herein and their methods of manufacturing are further described, for example, in EP-A1-2 700 683 (Elgimiabi et al.) and in WO 2017/197087 (Aizawa).

The thermally curable composition often comprises from 1 to 30 wt. % of the thermal curing system based on a total weight of the thermally curable composition. The amount is at least 1 wt. %, at least 2 wt. %, at least 3 wt. %, at least 5 wt. %, or at least 10 wt. % and up to 30 wt. %, up to 25 wt. %, up to 20 wt. %, up to 18 wt. %, up to 15 wt. %, up to 12 wt. %, or up to 10 wt. %. The amount can be, for example, from 1 to 25 wt. %, from 1 to 20 wt. %, from 2 to 20 wt. %, from 2 to 18 wt. %, from 2 to 15 wt. %, from 3 to 15 wt. %, from 3 to 12 wt. %, from 4 to 12 wt. %, or 5 to 15 wt. %, or 5 to 10 wt. % of the thermal curing system, wherein the weight percentages are based on the total weight of the thermally curable composition.

The thermal curing system contains the compound of Formula (I) and this compound is often 100 weight percent of the thermal curing system. In some embodiments, the thermal curing system contains 10 to 100 weight percent of the compound of Formula (I) based on a total weight of the thermal curing system. The amount can be at least 10, at least 20, at least 30, at least 40, at least 50, at least 60, at least 70, at least 80, at least 90, or at least 95 weight percent and up to 100, up to 95, up to 90, up to 80, up to 70, up to 60, or up to 50 weight percent based on a total weight of the thermal curing system. If the amount of the compound of Formula (I) is less than 100 weight percent, the remainder amount is due to the presence of a second (latent) thermal curing agent as described above.

The thermally curable composition typically comprises from 70 to 99 wt. % of the thermally curable resin based on the total weight of the thermally curable composition. The amount can be at least 70 wt. %, at least 75 wt. %, at least 80 wt. %, at least 85 wt. % and up to 99 wt. %, up to 95 wt. %, up to 90 wt. %, up to 85 wt. %, or up to 80 wt. %. The amount can be, for example, from 75 to 99 wt. %, from 80 to 98 wt. %, from 85 to 98 wt. %, or even from 85 to 95 wt. % based on the total weight of the thermally curable composition.

The thermally curable composition usually contains 70 to 99 wt. % of the thermally curable resin and 1 to 30 wt. % of the thermal curing system. In some examples, the thermally curable composition contains 75 to 99 wt. % of the thermally curable resin and 1 to 25 wt. % of the thermal curing system, 80 to 98 wt. % of the thermally curable resin and 2 to 20 wt. % of the thermal curing system, 85 to 98 wt. % of the thermally curable resin and 2 to 15 wt. % of the thermal curing system, 75 to 99 wt. % of the thermally curable resin and 1 to 25 wt. % of the thermal curing system, or 85 to 95 wt. %, of the thermally curable resin and 5 to 15 wt. % of the thermal curing system. Although the thermally curable composition is typically a one-part composition but, if desired, can be a two-part composition.

The thermally curable composition, particularly those that are in the form of a one-part composition, have a storage stability of at least 30 days when stored at room temperature and a relative humidity of 50 percent. The storage stability can be at least 40 days, at least 50 days, at least 60 days, at least 70 days, at least 80 days, at least 90 days, at least 100 days, at least 110 days, or even at least 120 days when stored at room temperature and 50 percent relative humidity. The storage stability refers to the length of time it takes the one-part composition to become a solid at room temperature.

In another aspect, a cured composition is provided that is a cured reaction product of the thermally curable composition. The cured composition is formed by heating the thermally curable composition to a temperature sufficient to dissociate the compound of Formula (I) in the thermal curing system. The temperature sufficient to dissociate the compound of Formula (I) is discussed above. The cured composition is typically an adhesive such as a structural adhesive that is suitable for bonding a first substrate to a second substrate. Any of the thermally curable compositions described above can be used to form cured compositions.

According to still another aspect, the present disclosure further relates to a first article comprising a first substrate and a first surface of a thermally curable composition as described above positioned adjacent to the first substrate. The thermally curable composition may be applied to any portion of the of the first substrate. That is, the first surface of the thermally curable composition can be adjacent to the entire first substrate or any fraction of the first substrate. In some embodiments, the first article further includes a second substrate positioned adjacent to a second surface of the thermally curable composition opposite the first surface of the thermally curable composition. The second surface of the thermally curable composition may be adjacent to the entire second substrate or any fraction of the second substrate.

According to yet another aspect, the present disclosure further relates to a second article comprising a first substrate and a first surface of a cured composition positioned adjacent to the first substrate. The cured composition is the same as described above. The cured composition is adhered to the first substrate. In most embodiments, the second article further comprises a second substrate positioned adjacent to a second surface of the cured composition that is opposite the first surface of the cured composition. In the embodiments with two substrates, the two substrates are bonded together through the cured composition.

Any suitable first and second substrates can be used to form the first and second articles. These substrates are often formed from metal-containing materials, ceramic materials, glass, polymeric materials, composite materials (e.g., a polymeric material with fibers or particles throughout), or combinations thereof The metal-containing materials can contain, for example, iron, aluminium, zirconium, chromium, nickel, magnesium, chromium, and mixtures thereof. The mixtures can be, for example steel, stainless steel, brass, bronze, and the like. In some embodiments, the metal-containing substrates are aluminium. In other embodiments, one or both substrates are a composite material such as a polymeric material that is reinforced with fibers. The fibers can be, for example, a polymeric material, ceramic material, glass, or a combination thereof.

In some embodiments of the first and/or second articles, the first substrate and/or the second substrates is selected to be useful for construction or transportation applications. For example, the thermally curable compositions and the cured compositions can be used in body-in-white bonding applications for the automotive industry such as for hem flange bonding of metal and/or composite material parts. In another example, the thermally curable compositions and the cured compositions can be used for structural bonding operations for the aeronautic and aerospace industries.

In another aspect, a method of bonding two substrates together is provided. The method includes providing (a) a first substrate, (b) a second substrate, and (c) a thermally curable composition. The thermally curable composition and suitable substrates are the same as described above. That is, the thermally curable composition comprises (1) a thermal curing system that includes a compound of Formula (I) and (2) a thermally curable resin. The method further includes positioning a first surface of the thermally curable composition adjacent to the first substrate. The method still further includes positioning the second substrate adjacent to a second surface of the thermally curable composition opposite the first surface of the thermally curable composition. The method yet further includes heating the thermally curable composition to form a cured composition that adheres to both the first substrate and the second substrate. The heating step can be performed by thermal heating, radiation heating, convection heating, induction heating, and any combinations thereof. In many embodiments, the heating step is performed by induction heating. The heating step is performed at a temperature sufficiently high to activate the thermal curing system. That is, the temperature is sufficiently high to dissociate the compound of Formula (I). The result of the method is the second article described above where the first substrate is bonded to the second substrate through the cured composition positioned between the two substrates.

If desired, the thermally curable composition on the first substrate can be heated to dissociate the compound of Formula (I) and initiate the curing reaction prior to placement of the second substrate adjacent to the heated (and perhaps partially reacted or cured) thermally curable composition.

EXAMPLES

The present disclosure is further illustrated by the following examples. These examples are merely for illustrative purposes only and are not meant to be limiting on the scope of the appended claims.

Raw Materials:

In the examples, the following raw materials are used:

Epikote 828 is an epoxy resin, commercially available from Hexion Specialty Chemicals GmbH, Iserlohn, Germany.

Ancamine K54 is 2,4,6-tris(dimethylaminomethyl)phenol, a curing agent commercially available from Evonik GmbH, Germany.

2,6-di-tert-butyl-4-dimethylaminomethylphenol (DTB) is commercially available from Sigma-Aldrich as an antioxidant.

Dyhard 100 SF (DICY) is a dicyandiamide-based latent curing agent, commercially available from Alzchem AG, Germany.

NaOH is commercially available from Sigma-Aldrich.

LiOH is commercially available from Sigma-Aldrich.

$Ca(OH)_2$ is commercially available from Sigma-Aldrich.

Aerosil $R^{202}$ is a fumed silica surface-treated with polydimethylsiloxane, commercially available from Evonik GmbH, Germany.

35

Test Methods:

Differential Scanning Calorimetry (DSC) Measurements According to DIN 65467

The curable precursor compositions were prepared from an extruded mixture of a one-part or a two-part (Part B and Part A) formulation. The preparation of the various components is described hereinafter. After a homogeneous mixture was achieved, the formulations were applied to the surface of the test panel for further testing in the manner specified below.

The DSC measurements were conducted on a Netzsch DSC 214 Polyma Differential Scanning Calorimeter (commercially available from Netzsch GmbH). Formulation samples for measurements had a mass ranging from 10-20 mg. A heating rate of 5 $Kmin^{-1}$ was used at a temperature ranging from (−20) to 300° C. The DSC onset temperature was calculated for a single peak with the peak temperature determined at the peak maximum and the total area of the peak calculated. The DSC onset temperature serves as an indicator of the curing performance of the thermal curing system used in the exemplary curable precursor compositions. The DSC onset temperatures are reported in ° C.

Overlap Shear Strength (OLS) According to DIN EN 1465

The surface of the OLS test panel (steel, grade DX54+ ZMB-RL1615) were cleaned with n-heptane. For the preparation of an Overlap Shear Strength test assembly, the formulation to be tested was placed onto one surface of the prepared test panel. Afterwards, the formulation to be tested was covered by a second test panel forming an overlap joint of 13 mm. The overlap joints were then clamped together using two binder clips. The test assemblies were stored at room temperature for 4 hours after bonding, and then placed into an air circulating oven for 30 minutes at 180 ° C. The test assemblies were left at ambient room temperature (23° C. +1- 2° C., 50% relative humidity +/−5%) for 24 hours prior to testing and the OLS strength was measured as described below. Five samples are measured for each of the test formulation to be tested and results averaged and reported in MPa.

Shelf-Life Measurements Via Complex Viscosity Measurements According to DIN 54458:2013-03

The curable precursor compositions were prepared from an extruded mixture of a one-part or a two-components (Part B and Part A) formulation. The preparation of the various components is described hereinafter. After a homogeneous mixture was achieved, the formulations were stored in a sealable plastic container and kept under standard conditions (23° C., 50% relative humidity) for further testing in the manner specified below.

The complex viscosity of the exemplary curable precursor compositions was measured with an Anton Paar MCR 302 rheometer (commercially available from Anton Paar GmbH) at various intervals by extracting samples from the sealed containers as described above. The measurements were started with an initial value for the freshly made compositions (day 0) and then repeated on days 28, 35,42 and 270 to track any changes in complex viscosity. The curable precursor compositions were qualified as having an acceptable shelf life if not fully cured within the storage time. The curable precursor compositions having an acceptable shelf life are still applicable, dispensable and curable. The complex viscosity values are reported in (Pa*s).

Examples:

Preparation of Metal Salts [Na-K54] and [Li-K54]

The two metal salts [Na-K54] and [Li-K54], hereinafter referred to respectively as compounds (1) and (2), were synthesized by dissolving the corresponding alkali hydroxide (NaOH or LiOH) in deionized water. A solution of equimolar quantity of alkali hydroxide and 2,4,6-tris(dimethylaminomethyl)phenol (K54) in deionized water was prepared and both aqueous solutions were combined. The combined solution was then stirred, and the excess water removed by rotary evaporation. Compounds (1) and (2) were obtained as off-white to light pink solids.

Preparation of Metal Salt [Ca-(K54)$_2$]

Metal salt [Ca-(K54)$_2$], hereinafter referred to respectively as compound (3), was synthesized by dissolving one molar equivalent (0.2 g) alkaline earth hydroxide (Ca(OH)$_2$) in 150 ml of deionized water, and then 2 molar equivalents (1.43 g) 2,4,6-tris(dimethylaminomethyl)phenol (K54) was added. The solution was stirred for 1 h and the excess water removed by a rotary evaporator. Compound (3) was obtained as a white powder.

Preparation of Metal Salt [Na-DTB]

Metal salt [Na-DTB], hereinafter referred to respectively as compound (4), was synthesized by dissolving one molar equivalent (0.5 g) of Na(OH) in 20 ml of methanol over a period of 1 hour. Then, one molar equivalent (3.3 g) of DTB was dissolved in 40 ml of methanol and stepwise added to the sodium hydroxide solution. The mixture, which was initially colorless, instantly changed its color to orange and later to an intense reddish purple. The mixture was then dried over 0.5 g MgSO$_4$ for 24 h, filtered and the methanol evaporated to obtain compound (4) as crystalline material.

Preparation of Metal Salt [Li-DTB]

Metal salt [Li-DTB], hereinafter referred to respectively as compound (5), was synthesized by dissolving one molar equivalent (7.0 g) of Li(OH) in 70 ml of methanol over a period of 1 hour. Then, one molar equivalent (43.9 g) of DTB was dissolved in 100 ml of methanol and stepwise added to the lithium hydroxide solution. The mixture, which was initially colorless, instantly changed its color to orange and later to an intense reddish purple. The mixture was then dried over 2.0 g MgSO$_4$ for 24 h, filtered and the methanol evaporated to obtain compound (5) as crystalline material.

General Preparation of the Exemplary Formulations Examples 1 to 9 and Comparative Examples CE-1, CE-2, and CE-3 for Performance Testing The exemplary thermally curable compositions according of Examples 1 to 8 and comparative example CE-2 are prepared by combining 40 g of Epikote 828, 1 g of Aerosil 8202, optionally 1 g of DICY, and the required amount of the curing agent. Example 9 and example CE-1 are prepared by combining 49.5 g of Epikote 828 and the required amount of curing agent. The formulation of CE-1 comprises exclusively K54 as curing agent. Comparative example CE-3 consists of 40 g Epikote 828 and 1 g of DICY as sole curing agent. The curing system weight percentage is based on the overall composition. The corresponding formulations are listed in Table 1 below.

TABLE 1

Exemplary formulations

| Examples | Thermal curing system weight % | | Curing agent type |
|---|---|---|---|
| | Curing agent | DICY | |
| Example 1 | 10 | — | Compound (1) |
| Example 2 | 10 | — | Compound (2) |
| Example 3 | 5 | — | Compound (3) |
| Example 4 | 5 | 5 | Compound (3) |
| Example 5 | 10 | 10 | Compound (4) |
| Example 6 | 10 | 10 | Compound (5) |
| Example 7 | 5 | 5 | Compound (1) |
| Example 8 | 5 | 5 | Compound (2) |
| Example 9 | 10 | — | Compound (3) |
| Example CE-1 | 10 | — | K54 |
| Example CE-2 | 10 | 10 | K54 |
| Example CE-3 | — | 10 | DICY |

Curing Performance

The curing performance of various exemplary formulations is tested via DSC measurements by measuring the DSC onset temperature of the corresponding thermally curable composition.

TABLE 2

Results of the DSC measurements.

| | Ex. 1 | Ex. 2 | Ex. 3 | Ex. 4 | Ex. 5 | Ex. 6 | Ex. 9 | CE-1 | CE-2 | CE-3 |
|---|---|---|---|---|---|---|---|---|---|---|
| DSC onset temperature (° C.) | 63 | 78 | 90 | 101 | 99 | 96 | 90 | 80 | 80 | 185 |

As can be seen from the results shown in Table 2, the thermal curing systems according to the present disclosure (Examples 1 to 9) provide excellent curing performance while being triggered or activated at a temperature way lower than a comparative curing system not according to the present disclosure (Example CE-3).

Shelf Life Performance

The shelf life (storage stability) performance of various exemplary formulations is tested via complex viscosity measurements. The shelf life corresponds to the length of time it takes for the curable composition to become a solid.

TABLE 3

Results of the viscosity measurements.

| | Example 7 | Example 8 | Example 4 | Example 9 | CE-1 | CE-2 |
|---|---|---|---|---|---|---|
| Viscosity initial (Pa*s) | 75 | 60 | 45 | 12 | 12 | 50 |
| Viscosity day 2 (Pa*s) | — | — | — | — | Solid/ fully cured | Solid/ fully cured |
| Viscosity day 28 (Pa*s) | — | 105 | 132 | — | — | — |
| Viscosity day 35 (Pa*s) | — | 135 | 210 | — | — | — |
| Viscosity day 42 (Pa*s) | 115 | — | — | — | — | — |
| Viscosity day 270 (Pa*s) | — | — | — | 30 | — | — |

As can be seen from the results shown in Table 3, the thermal curing systems according to the present disclosure (Examples 7, 8, 4 and 9) provide excellent storage stability performance (e.g., greater than 30 days) when compared to curing systems not according to the present disclosure (Example CE-1 and CE-2 had a storage stability less than 2 days).

OLS Strength Performance

The adhesive performance of various exemplary formulations is tested via OLS measurements.

TABLE 4

Results of the OLS Tests.

| | Example 7 | Example 8 | Example 4 |
|---|---|---|---|
| OLS (MPa) | 9.7 | 12.6 | 13.3 |
| Failure Mode | cohesive | cohesive | cohesive |

As can be seen from the results shown in Table 4, the thermal curing systems according to the present disclosure (Examples 9, 10 and 4) provide the corresponding epoxy-based thermally curable compositions with excellent adhesion performance.

I claim:

1. A thermally curable composition comprising:
   a) a thermally curable resin; and
   b) a thermal curing system comprising a compound of formula (I)

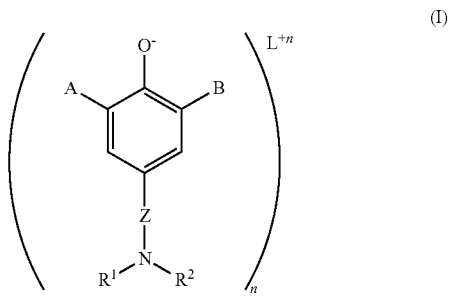

(I)

wherein:
   $L^{+n}$ is a cation of an alkali metal or alkaline earth metal where n is equal to 1 or 2;
   A and B are each independently an alkyl having 1 to 12 carbon atoms, a cycloalkyl having 3 to 12 carbon atoms, an aryl having 6 to 12 carbon atoms, an aralkyl or alkaryl having from 7 to 12 carbon atoms;
   Z is an alkylene having from 1 to 12 carbon atoms;
   $R^1$ and $R^2$ are each independently an alkyl groups having from 1 to 6 carbon atoms; and
   the thermally curable composition having a storage stability of at least 30 days when stored at room temperature and 50 percent relative humidity.

2. The thermally curable composition of claim 1, wherein A and B are each independently tert-butyl, neopentyl, tert-pentyl, neo-hexyl, or tert-hexyl.

3. The thermally curable composition of claim 1, wherein $L^{+n}$ is a cation of sodium, lithium, potassium, calcium, or magnesium.

4. The thermally curable composition of claim 1, wherein the compound of Formula (I) is [2,6-di-tert-butyl-4-(dimethylaminomethyl) phenoxy]-lithium, [2,6-di-tert-butyl-4-(dimethylaminomethyl) phenoxy]-sodium, [2,6-di-tert-butyl-4-(dimethylaminomethyl) phenoxy]-potassium, bis [2,6-di-tert-butyl-4-(dimethylaminomethyl) phenoxy]-calcium, bis [2,6-di-tert-butyl-4-(dimethylaminomethyl) phenoxy]-magnesium, or a mixture thereof.

5. The thermally curable composition of claim 1, wherein the compound of Formula (I) dissociates at a temperature equal to at least 60 degrees Celsius.

6. The thermally curable composition of claim 1, wherein the thermally curable resin comprises a plurality of functional groups selected from the group consisting of an epoxy group, isocyanate group, urethane group, and a mixture thereof.

7. A cured composition comprising reaction product of the thermally curable composition of claim 1.

8. The cured composition of claim 7, wherein the cured composition is a structural adhesive composition.

9. A first article comprising:
   a first substrate; and
   a thermally curable composition of claim 1, wherein a first surface of the thermally curable composition is positioned adjacent to the first substrate.

10. The first article of claim 9, wherein the first article further comprises a second substrate and wherein the second substrate is positioned adjacent to a second surface of the thermally curable composition opposite the first surface of the thermally curable composition.

11. A second article comprising:
   a first substrate;
   a second substrate; and
   a cured composition of claim 7, wherein a first surface of the cured composition is positioned adjacent to the first substrate and a second surface of the cured composition is positioned adjacent to the second substrate, the second surface of the cured composition being opposite the first surface of the cured composition, the first substrate being bonded to the second substrate through the cured composition.

12. A method of bonding two substrates together the method comprising:
   providing (a) a first substrate, (b) a second substrate, and (c) a thermally curable composition according to claim 1;
   positioning a first surface of the thermally curable composition adjacent to the first substrate;
   positioning the second substrate adjacent to a second surface of the thermally curable composition opposite the first surface of the thermally curable composition; and
   heating the thermally curable composition to form a cured composition that bonds the first substrate to the second substrate.

* * * * *